US008601594B2

United States Patent
Geva

(10) Patent No.: US 8,601,594 B2
(45) Date of Patent: Dec. 3, 2013

(54) AUTOMATICALLY CLASSIFYING AN INPUT FROM FIELD WITH RESPECT TO SENSITIVITY OF INFORMATION IT IS DESIGNED TO HOLD

(75) Inventor: Amir Geva, Yokneam (IL)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 12/955,938

(22) Filed: Nov. 30, 2010

(65) Prior Publication Data

US 2012/0137371 A1 May 31, 2012

(51) Int. Cl.
- G06F 7/00 (2006.01)
- G06F 7/02 (2006.01)
- G06F 7/04 (2006.01)
- G06F 7/08 (2006.01)

(52) U.S. Cl.
USPC ............... 726/26; 726/22; 707/709; 707/710

(58) Field of Classification Search
USPC .............................. 726/26, 22; 707/709–710
See application file for complete search history.

(56) References Cited

U.S. PATENT DOCUMENTS

| | | | |
|---|---|---|---|
| 6,212,526 B1 | 4/2001 | Chaudhuri et al. | |
| 6,324,646 B1 | 11/2001 | Chen et al. | |
| 7,284,000 B2 | 10/2007 | Kuehr-McLaren et al. | |
| 8,127,365 B1 * | 2/2012 | Liu et al. | 726/26 |
| 2002/0065901 A1 * | 5/2002 | Goodwin et al. | 709/218 |
| 2009/0106835 A1 | 4/2009 | Corrao et al. | |
| 2009/0299994 A1 | 12/2009 | Krishnamurthy et al. | |
| 2009/0300751 A1 | 12/2009 | Krishnamurthy et al. | |
| 2010/0011000 A1 | 1/2010 | Chakra et al. | |
| 2010/0024037 A1 | 1/2010 | Grzymala-Busse et al. | |
| 2010/0057876 A1 * | 3/2010 | Yu | 709/206 |
| 2010/0074315 A1 * | 3/2010 | Hahn | 375/227 |
| 2010/0074525 A1 | 3/2010 | Drory et al. | |
| 2010/0076957 A1 | 3/2010 | Staddon et al. | |

OTHER PUBLICATIONS

Comparative Accuracy Test Findings of PortAuthority Technologies PreciseID™ versus Leading Gateway Vendors, "Information Leak Prevention Accuracy and Security Tests", Version 1.0 May 2006. URL:http://www.percept.com/wp/Leak%20Prevention%20Technology_White%20Paper_FINAL_UPDATES%20v2.pdf.
"Cell Com Puts a Stop to Data Leakage With Websense Data Security Suite", case study: Cellcom. 2009 Websense. URL; http://www.websense.com/assets/case-studies/casestudy-cellcom-israel-en.pdf.

* cited by examiner

Primary Examiner — Beemnet Dada
Assistant Examiner — Kalish Bell

(57) ABSTRACT

A method and system for automatically classifying an input form field as designed to hold sensitive information. The method may include selecting an input characteristic associated with the input form field. The method may also include classifying the input form field as designed to hold sensitive information by considering classifying information of other input form fields having the same input characteristic. The method may further include statistically determining whether a similar input form field is indicated as designed to hold sensitive information by at least a predetermined threshold value of the other input fields. A computer program product is also disclosed.

15 Claims, 4 Drawing Sheets

AUTOMATICALLY CLASSIFYING AN INPUT FROM FIELD WITH RESPECT TO SENSITIVITY OF INFORMATION IT IS DESIGNED TO HOLD

BACKGROUND

Data Leakage Prevention (DLP), also known as Data Loss Prevention, Information Leak Prevention and Detection (ILPD), Content Monitoring and Filtering (CMF), Information Protection and Control (IPC) refers to systems that identify, monitor and protect data in use (e.g. end-user actions), data in motion (e.g. network communications) and data at rest (e.g. stored data).

Such systems examine information either stored or transmitted through some medium and try to filter out information that is deemed to be sensitive/private or otherwise restricted.

Many large firms must comply with government and/or commercial regulations requiring control over information and demanding appropriate measures be taken to secure data.

DLP systems are usually subjected to explicit policies that define what is considered as sensitive information. The "sensitive information" may be determined by considering one or more sensitive data characteristics.

For example, a DLP system may look for a title keyword from a list of title keywords which are indicative of sensitive information. In the phrase "Social Security Number: 123456789", the label text preceding the number is a defined keyword indicative of sensitive information (which, in this case, is the number itself).

In another example a DLP system may look for a content format of a list of formats which are indicative of sensitive information. The format of the following alphanumeric string "1234-5678-9123-4567" is similar to the format of credit card numbers and is thus indicative of potentially sensitive information.

The actual definition of sensitive information is commonly user-defined and may depend on organization rules that pertain to the organization using the DLP system and/or on the specific state rules and laws.

SUMMARY

According to an embodiment of the present invention there is provided a method for automatically classifying an input form field as designed to hold sensitive information. The method may include selecting an input characteristic associated with the input form field. The method may also include classifying the input form field as designed to hold sensitive information by considering classifying information of other input form fields having the same input characteristic. The method may further include statistically determining whether a similar input form field is indicated as designed to hold sensitive information by at least a predetermined threshold value of the other input fields.

Furthermore, in accordance with some embodiments of the present invention, there is provided a computer program product for automatically classifying an input form field as designed to hold sensitive information, stored on a non-transitory tangible computer-readable storage medium. The computer program may include code for selecting an input characteristic associated with the input form field. The computer program product may also include code for classifying the input form field as designed to hold sensitive information by considering classifying information of other input form fields having the same input characteristic, and statistically determining whether a similar input form field is indicated as designed to hold sensitive information by at least a predetermined threshold value of the other input fields.

Furthermore, in accordance with some embodiments of the present invention, there is provided a system for automatically classifying an input form field as designed to hold sensitive information. The system may include a processor configured to select an input characteristic associated with the input form field; and to classify the input form field as designed to hold sensitive information by considering classifying information of other input form fields having the same input characteristic, and statistically determining whether a similar input form field is indicated as designed to hold sensitive information by at least a predetermined threshold value of the other input fields.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
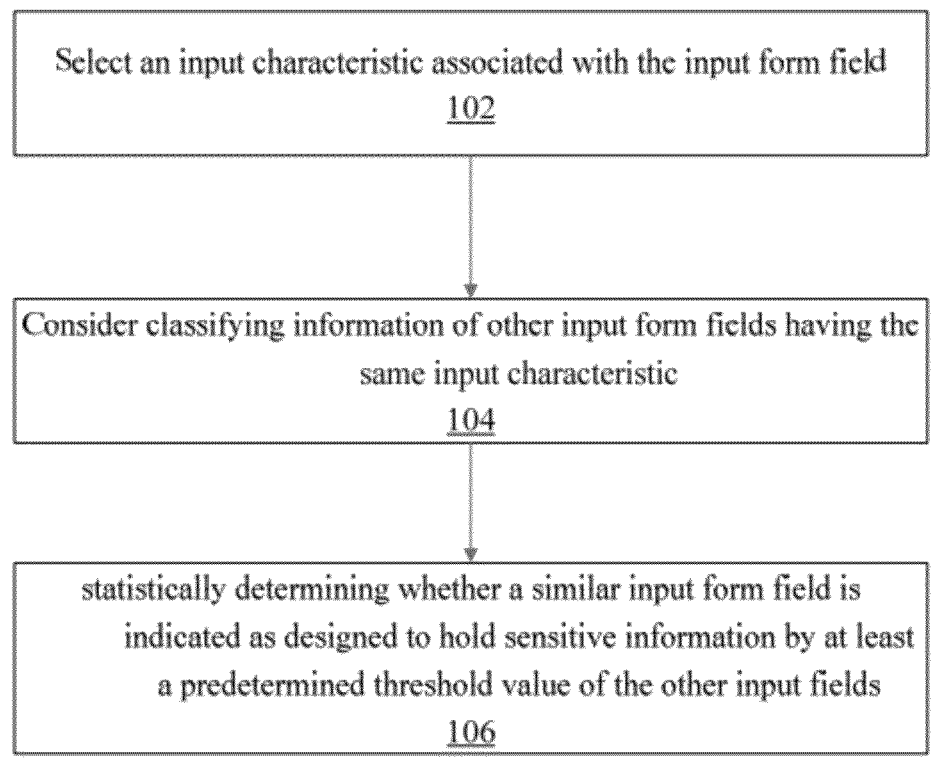
FIG. 1 illustrates a method for automatically classifying an input form field with respect to sensitivity of information it is designed to hold, in accordance with some embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to an embodiment of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Flowchart/s and block diagram/s in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In accordance with embodiments of the present invention, system, method and computer program product are disclosed herein, for automatically detecting input fields in a form which may hold or be designed to hold sensitive information.

According to embodiments of the present invention form fields may be identified as containing "sensitive information" by examining input fields of forms and determining statistically what fields (or forms) are indicated as sensitive by a majority (or over other predetermined threshold) of organizations or other entities managing these forms.

For example, if 95 out of 100 organizations consider the field "Address" to be sensitive, it is likely that any field with the label "address" contains potentially sensitive information. The term "sensitive information", in the context of the present invention, is understood to mean any information to which it is required or desired to restrict or prevent public access.

In order to collect data for analysis, according to embodiments of the present invention, one may consider the performing crawling within the World Wide Web (hereinafter referred to as "the Web"). Web forms may be considered as a subset of all information available on the Web. Forms, by nature consist of fields and as such, usually have labels that define the type of information saved in these fields (e.g. name, address, ID number, telephone number, Social Security number, etc.). Collecting such information may be easy and straight forward to implement.

Another feature which may be referred to, when collecting information on form fields may be the type of the Web form in which the input field exists. Web pages are typically classified as either normal (http) pages or secure (https) pages (this is sometimes referred to as the "security level" of the page). Organizations usually place sensitive forms on secure pages in order to prevent leakage of their information and this knowledge may be used when determining the sensitivity of information hosted in form fields.

For example, if a field titled "Search" appears in 80% of the cases on normal pages, than it may be wise to determine that the field "search" should probably not be considered as containing sensitive information. On the other hand, if the field "Credit Card Number" appears in 95% of the cases on secure pages, than one may determine that the field could be considered as holding sensitive information.

In accordance with some embodiments of the present invention, Reference is now made to the figures.

FIG. 1 illustrates a method for automatically classifying an input form field with respect to sensitivity of information it is designed to hold, in accordance with some embodiments of the present invention. The method may include selecting 102 an input characteristic associated with the input form field. The method may also include classifying 104 the input form field as designed to hold sensitive information by considering classifying information of other input form fields having the same input characteristic, and statistically determining 106 whether a similar input form field is indicated as designed to hold sensitive information by at least a predetermined threshold value of the other input fields.

The method may include collecting the classifying information, for example, by performing crawling in a network (e.g. the Web).

A database of the classifying information may be maintained to which reference may be made when it is desired to classify an input form field.

The input characteristic of the input form field may be directly associated with the form field, e.g. field label, field format, and it may also be indirectly associated with the input form field, e.g. by referring to the classification of a form in which at least one of the other input form fields exists.

Figure 2:
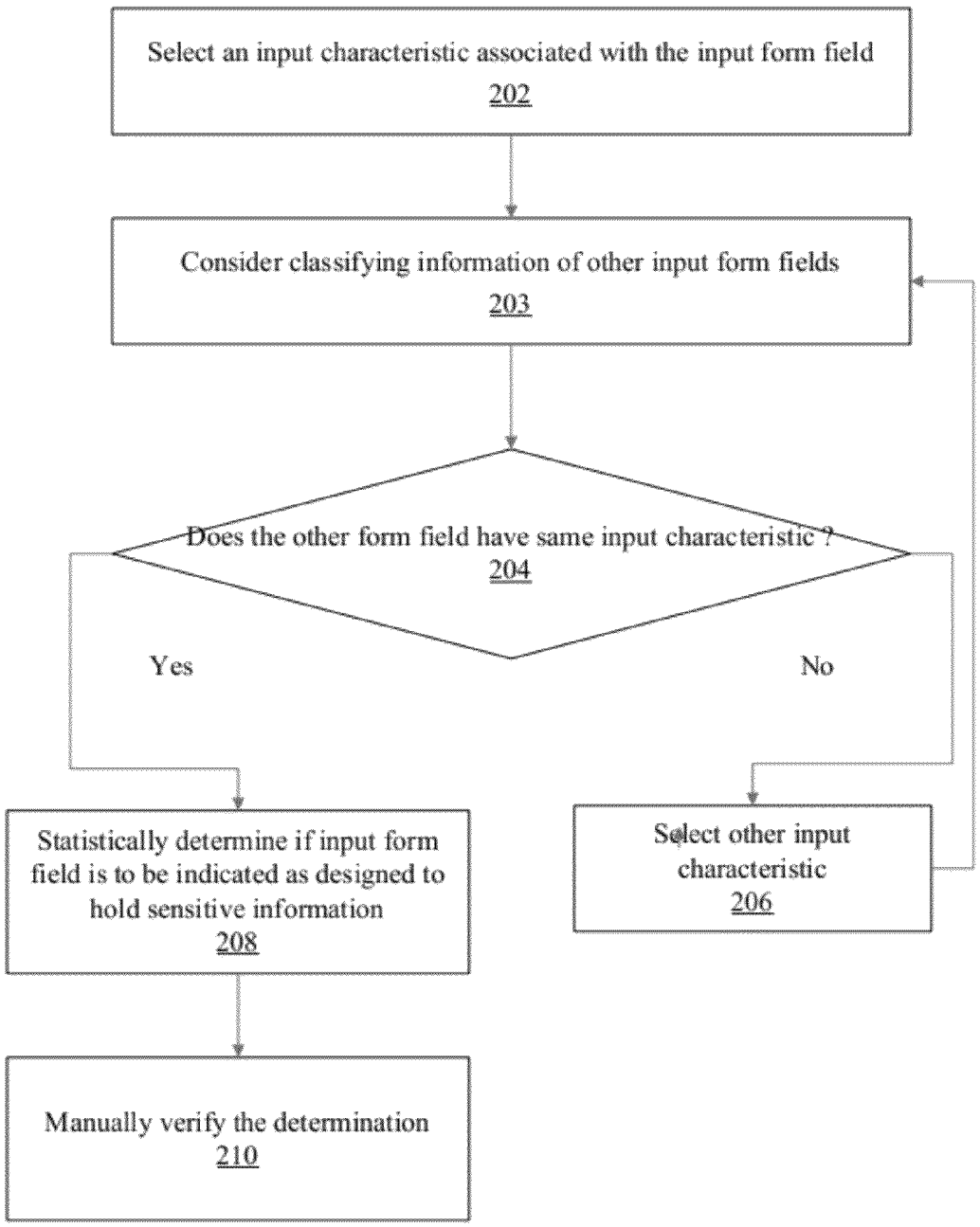
FIG. 2 illustrates an algorithm for automatically classifying an input form field with respect to sensitivity of information it is designed to hold, in accordance with some embodiments of the present invention.

FIG. 2 illustrates an algorithm for automatically classifying an input form field with respect to sensitivity of information it is designed to hold, in accordance with some embodiments of the present invention.

The algorithm may include selecting 202 an input characteristic associated with the input form field. Then, classifying information of other input form fields is considered 203. It is then determined 204 whether the other form fields has the same input characteristic.

If the other form fields have the same characteristic, then it is statistically determined 208 whether the input form field ought to be indicated as designed to hold sensitive information.

If the other form fields do not have the same characteristic, other input characteristic is selected 206 and the classifying information of other input form fields is considered 203 again.

Figure 3:
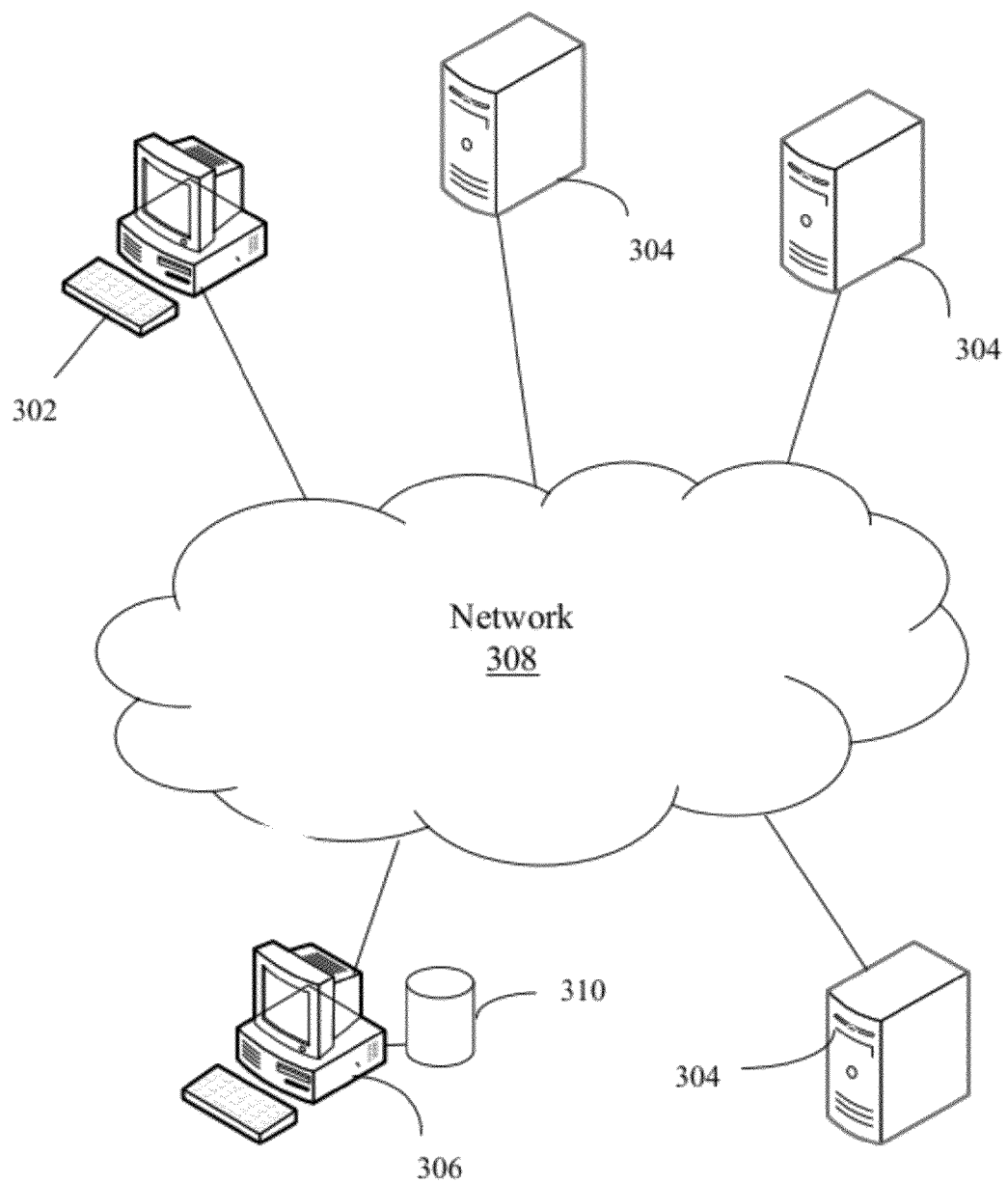
FIG. 3 illustrates a network system for automatically classifying an input form field with respect to sensitivity of information it is designed to hold, in accordance with some embodiments of the present invention.

FIG. 3 illustrates a network system for automatically classifying an input form field with respect to sensitivity of information it is designed to hold, in accordance with some embodiments of the present invention. Such a system may include servers (304) and/or hosts (302, 306) connected to and communicating over network 308, such as, for example, the Internet. A method for automatically classifying an input form field as designed to hold sensitive information, in accordance with some embodiments of the present invention, such as for example the method described hereinabove may be applied on the system, for example, by executing a program on one or more of the devices (servers and/or hosts).

For example, in one embodiment of the present invention, an algorithm for automatically classifying an input form field as designed to hold sensitive information, in accordance with some embodiments of the present invention, may be executed on one or more of hosts 306, and/or on server 304.

Classifying information of other input form fields relating to input characteristic, may be gathered from the servers and hosts of the network and saved on one or several of the servers and/or hosts of the network.

A crawling application may be executed on one or more of the servers and/or hosts of the network, aimed at collecting classifying information relating to other input form fields from servers and/or hosts of the network. The classifying information may be stored on storage medium 310 of host 306, on storage medium of another network device, or stored, distributed, on several storage mediums.

Figure 4:
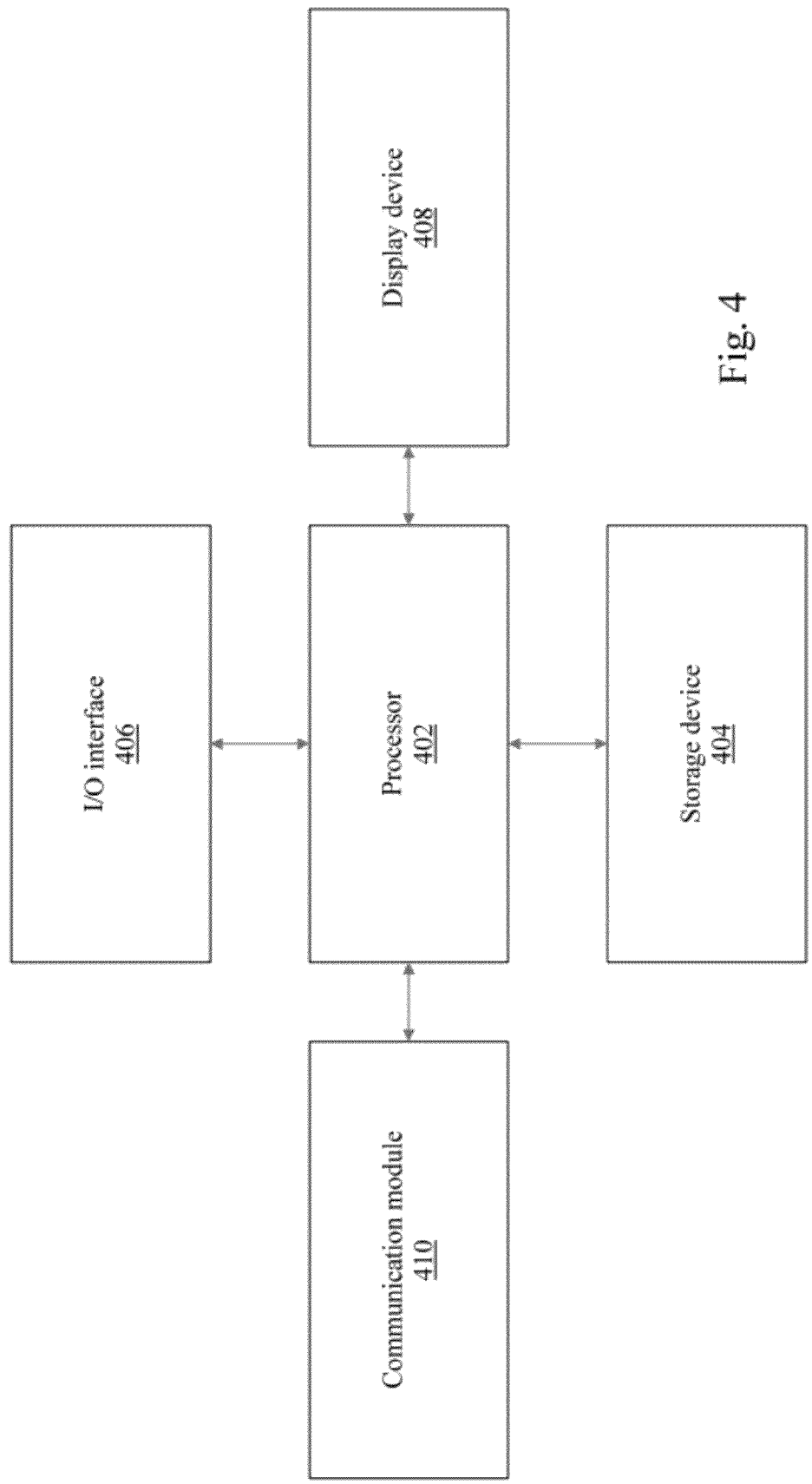
FIG. 4 illustrates a computing system for automatically classifying an input form field with respect to sensitivity of information it is designed to hold, in accordance with some embodiments of the present invention.

FIG. 4 illustrates a computing system for automatically classifying an input form field with respect to sensitivity of information it is designed to hold, in accordance with some embodiments of the present invention.

The system may include a processor 402, which may be configured to execute an algorithm for automatically classifying an input form field with respect to sensitivity of information it is designed to hold, in accordance with some embodiments of the present invention. The system may further include an Input/Output (I/O) interface 406 for input and/or output actions, display device 408 for displaying information and graphical user interfaces, storage device 404 for storing programs and data (e.g. database) and communication module 410 for communicating with other machines over a communication link (directly or over a network).

A method for automatically classifying an input form field with respect to sensitivity of information it is designed to hold, in accordance with some embodiments of the present invention, may include providing a user with verification step, where a user is requested (e.g. prompted) to confirm the automatic classification of the input form field (as designed to hold secure or insecure information), and/or allowed to make another selection (e.g. manually change the classification of the input form field from "secure" to "insecure" or vice versa).

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A computerized method for automatically classifying an analyzed input form field of an analyzed form with respect to sensitivity of information the analyzed input form field is designed to hold, the method comprising:
collecting, from a network, classifying information comprising a plurality of input characteristics of a plurality of input form fields of at least one web form, wherein the collecting of the classifying information includes performing crawling in the network;
providing the analyzed form; and
for the analyzed input form field, using a hardware processor to:
select, as a selected input characteristic, a certain input characteristic associated with the analyzed input form field, wherein:
the selected input characteristic is similar to a plurality of similar input form fields from the plurality of input form fields of the at least one web form in the classifying information; and
the selected input characteristic comprises one or more input characteristics selected from a group of input characteristics consisting of:
field label, field format, classification of a form in which at least one of the plurality of similar input form fields exists, and security level of the form in which said at least one of the plurality of similar input form fields exist;

when each one of the plurality of similar input form fields do not have the certain input characteristic, select a different input characteristic associated with the analyzed input form field, as the selected input characteristic, wherein the different input characteristic is different from the certain input characteristic; and when each one of the plurality of similar input form fields have the selected input characteristic, statistically determine whether the analyzed input form field is designed to hold sensitive information by considering the plurality of similar input form fields.

2. The computerized method of claim 1, wherein the network is the internet; wherein said collecting further comprises collecting the classifying information from the internet.

3. The computerized method of claim 2, wherein the classifying information is maintained in a database.

4. The computerized method of claim 1, further comprising requesting a user to verify the classification of the analyzed input form field.

5. The computerized method of claim 1, further comprising allowing a user to manually change the classification of the analyzed input form field.

6. A computer program product for automatically classifying an analyzed input form field of an analyzed form with respect to sensitivity of information the analyzed input form field is designed to hold, wherein the computer program product is stored on a non-transitory tangible computer-readable storage medium, the computer program including code for:

collecting, from a network, classifying information comprising a plurality of input characteristics of a plurality of input form fields of at least one web form, wherein the collecting of the classifying information includes performing crawling in the network;

providing the analyzed form;

for the analyzed input form field, using a computerized processor to:

select, as a selected input characteristic, a certain input characteristic associated with the analyzed input form field, wherein:

the selected input characteristic is similar to a plurality of similar input form fields from the plurality of input form fields of the at least one web form in the classifying information; and the selected input characteristic comprises one or more input characteristics selected from a group of input characteristics consisting of:

field label, field format, classification of a form in which at least one of the plurality of similar input form fields exists, and security level of the form in which said at least one of the plurality of similar input form fields exist;

when each one of the plurality of similar input form fields do not have the certain input characteristic, select a different input a different input characteristic associated with the analyzed input form field, as the selected input characteristic, wherein the different input characteristic is different from the certain input characteristic; and when each one of the plurality of similar input form fields have the selected input characteristic, statistically determine whether the analyzed input form field is designed to hold sensitive information by considering the plurality of similar input form fields.

7. The computer program product of claim 6, wherein the network is the internet; wherein said collecting further comprises collecting the classifying information from the internet.

8. The computer program product of claim 7, wherein the classifying information is maintained in a database.

9. The computer program product of claim 6, further comprising requesting a user to verify the classification of the analyzed input form field.

10. The computer program product of claim 6, further comprising allowing a user to manually change the classification of the analyzed input form field.

11. A system for automatically classifying an analyzed input form field of an analyzed form with respect to sensitivity of information the analyzed input form field is designed to hold, the system comprising:

a hardware processor configured to:

collect, from a network, classifying information comprising a plurality of input characteristics of a plurality of input form fields of at least one web form, wherein the collecting of the classifying information includes performing crawling in the network;

for the analyzed input form field, using the hardware processor to select, as a selected input characteristic, a certain input characteristic associated with the analyzed input form field; wherein:

the selected input characteristic is similar to a plurality of similar input form fields from the plurality of input form fields of the at least one web form in the classifying information; and the selected input characteristic comprises one or more input characteristics selected from a group of input characteristics consisting of:

field label, field format, classification of a form in which at least one of the plurality of similar input form fields exists, and security level of the form in which said at least one of the plurality of similar input form fields exist;

when each one of the plurality of similar input form fields do not have the certain input characteristic, select a different input characteristic associated with the analyzed input form field, as the selected input characteristic, wherein the different input characteristic is different from the certain input characteristic; and when each one of the plurality of similar input form fields have the selected input characteristic, statistically determine whether the input form field is designed to hold sensitive information by considering the plurality of similar input form fields.

12. The system of claim 11, wherein the network is the internet; wherein the computerized processor is further configured to collect the classifying information from the internet.

13. The system of claim 12, wherein the classifying information is maintained in a database.

14. The system of claim 11, further comprising requesting a user to verify the classification of the analyzed input form field.

15. The system of claim 11, further comprising allowing a user to manually change the classification of the analyzed input form field.

* * * * *